United States Patent
Sakurai et al.

(10) Patent No.: US 10,553,910 B2
(45) Date of Patent: Feb. 4, 2020

(54) LITHIUM-ION BATTERY FORMATION PROCESS

(71) Applicants: TOYOTA MOTOR EUROPE, Brussels (BE); TOYOTA JIDOSHA KABUSHIKI KAISHA, Toyota-shi, Aichi-ken (JP)

(72) Inventors: Takahiro Sakurai, Miyoshi (JP); Tomohide Sumi, Nagoya (JP); Yoshio Matsuyama, Nisshin (JP)

(73) Assignees: TOYOTA MOTOR EUROPE, Brussels (BE); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/077,797

(22) PCT Filed: Mar. 25, 2016

(86) PCT No.: PCT/EP2016/056699
§ 371 (c)(1),
(2) Date: Aug. 14, 2018

(87) PCT Pub. No.: WO2017/162308
PCT Pub. Date: Sep. 28, 2017

(65) Prior Publication Data
US 2019/0245250 A1    Aug. 8, 2019

(51) Int. Cl.
*H01M 10/42* (2006.01)
*H01M 10/0525* (2010.01)
(Continued)

(52) U.S. Cl.
CPC ... *H01M 10/4235* (2013.01); *H01M 10/0525* (2013.01); *H01M 10/0567* (2013.01); *H01M 10/446* (2013.01)

(58) Field of Classification Search
CPC ........ H01M 10/4235; H01M 10/0525; H01M 10/0567; H01M 10/446
See application file for complete search history.

(56) References Cited

U.S. PATENT DOCUMENTS

2014/0272607 A1*  9/2014  Amine ............... H01M 10/052
                                                          429/338
2014/0335427 A1* 11/2014  Khasanov ......... H01M 10/0567
                                                          429/338
(Continued)

FOREIGN PATENT DOCUMENTS

JP      2004-228010 A    8/2004
JP      2010-00983 A     1/2010
(Continued)

OTHER PUBLICATIONS

E. Hatzikraniotis et al.; "Differential Capacity Analysis, A tool to examine the performance of graphites for Li-ion cells"; Materials for Lithium-Ion Batteries; Jan. 1, 2000; Kluwer Academic Publishers; pp. 529-534.

(Continued)

*Primary Examiner* — Lisa S Park
(74) *Attorney, Agent, or Firm* — Oliff PLC

(57) ABSTRACT

A method of performing a formation process for a lithium-ion cell having an anode, a cathode, an electrolyte and a separator, the formation process including adding an additive to the electrolyte for improving a solid electrolyte interface build-up on the anode, performing a first charge of the cell at a first predetermined rate, performing a cycle of discharging/charging the cell at the first predetermined rate, repeating the cycle until a cycle maximum dQ/dV peak value is smaller than or equal to a predetermined dQ/dV value during charging of the cell and charging the cell to a fully charged capacity at a second predetermine rate, the (Continued)

second predetermined rate being greater than the first predetermined rate.

15 Claims, 3 Drawing Sheets

(51) Int. Cl.
*H01M 10/0567* (2010.01)
*H01M 10/44* (2006.01)

(56) References Cited

U.S. PATENT DOCUMENTS

| | | |
|---|---|---|
| 2015/0004474 A1 | 1/2015 | Lee et al. |
| 2015/0060290 A1 | 3/2015 | Xu |

FOREIGN PATENT DOCUMENTS

| | | |
|---|---|---|
| JP | 2011-222358 A | 11/2011 |
| JP | 2012-227035 A | 11/2012 |
| WO | 2013/042421 A1 | 3/2013 |

OTHER PUBLICATIONS

Chen et al.; "LiPF6/LiBOB blend salt electrolyte for high-power lithium-ion batteries"; Electrochimica Acta, Elsevier Science Publishers, vol. 51. No. 16; Apr. 10, 2006; pp. 3322-3326.

Rayavarapu et al.; "Variation in structure and Li+-ion migration in argyrodite-type Li6PS5X (X=Cl, Br, I) solid electrolytes"; J Solid State Electrochem (2012); Published Oct. 28, 2011; pp. 1807-1813.

Chen et al.; "New-concept Batteries Based on Aqueous Li+/Na+ Mixed-ion Electrolytes"; Ningbo Institute of Materials Technology and Engineering, Chinese Academy of Sciences; Scientific Reports 3, 1946; DOI:10.1038/srep01946; Published Jun. 5, 2013; pp. 1-7.

Boulineau et al.; "Mechanochemical synthesis of Li-argyrodite Li6PS5X (X=Cl, Br, I) as sulfur-based solid electrolytes for all solid state batteries application"; Solid State Ionics 221 (2012), pp. 1-5; Published Jun. 23, 2012.

Sep. 3, 2019 Translation of Office Action issued in Japanese Patent Application No. 2018-550378.

\* cited by examiner

LITHIUM-ION BATTERY FORMATION PROCESS

FIELD OF THE DISCLOSURE

The present disclosure is related to lithium ion batteries or cells, and more particularly to an improved method for initially charging such batteries (formation process).

BACKGROUND OF THE DISCLOSURE

Lithium-ion batteries are part of a family of rechargeable battery types in which lithium ions move from the negative electrode to the positive electrode during discharge and from the positive electrode to the negative electrode when charging.

There are various types of lithium-ion battery. The anode comprises generally carbon and the cathode comprises a lithium compound. The anode and the cathode are separated by a separator made from a porous polymer, such as a micro-perforated plastic sheet, which allows ions to pass through. The anode, cathode and separator are immersed in an electrolyte.

Lithium-ion batteries are classified according to the cathode material.

Once the lithium-ion battery is assembled, before the battery is suitable to be used, the lithium-ion battery may be put through at least one precisely controlled charge/discharge cycle to activate the working material. This step is called the formation process. This formation process provides the initial full charge of the battery.

During the formation process, a solid electrolyte interface (SEI) is formed on the anode. The SEI formation is important for the lifetime of the lithium-ion battery or cell.

Methods for initial charging, i.e., for the formation process, of a lithium-ion battery have been proposed.

Typically, the battery is charged at a constant charge rate. The charge rate is also expressed as a C-rate, which represents a charge or a discharge rate equal to the capacity of a battery in one hour. It has been found that the SEI is best formed at small C-rate, which means that the initial charging is performed over an extended period of time. Indeed, fully charging a battery at a C-rate equal to C/5 would take approximately five hours. The battery is charged at a small C-rate up to the fully charged voltage of the battery in order for the SEI to form on the carbon anode during the first charge and then the battery is held constant at the fully charged voltage until the current drops below a threshold. The battery is then left to rest for two hours and is discharged at a small C-rate to a pre-set voltage, i.e., the discharge cut-off voltage. This formation process may be cycled at least once.

In order to reduce the manufacturing time of lithium-ion batteries, so-called dynamic forming processes have been proposed. In such processes, the battery is charged at a small C-rate up to the end of the SEI layer formation on the anode, corresponding to a threshold voltage value, and then, a large C-rate is used to charge the battery up to the fully charged voltage. For example US 2015/060290 discloses such a formation protocol which still involves at least charging the battery up to the fully charged voltage at least twice, and resting the cell for two hours between each charge/discharge of the cell, the total duration of the dynamic formation process being greater than forty hours. Moreover, the voltage up to which the cell needs to be charged at a small C-rate may only be determined by carrying out tests for each new type or category of cell to be produced. Indeed, this threshold voltage value varies from one type of cell to another.

Additives have also been added to the electrolyte to improve the formation of the SEI and therefore enhancing the anode stability.

SUMMARY OF THE DISCLOSURE

Currently, it remains desirable to reduce the duration of the formation process while having a battery that will exhibit good properties over a large number of charge/discharge cycles.

Therefore, according to embodiments of the present disclosure, a method of performing a formation process for a lithium-ion cell having an anode, a cathode, an electrolyte and a separator is provided. The method including:
  adding an additive to the electrolyte for improving a solid electrolyte interface build-up on the anode;
  performing a first charge of the cell at a first predetermined rate, the first charge comprising:
    calculating dQ/dV during the first charge;
    detecting a peak in the dQ/dV curve;
    determining an end of peak voltage value and a maximum peak voltage value corresponding to a first maximum dQ/dV peak value, the end of peak voltage value being a voltage at which a dQ/dV value is smaller than or equal to a first predetermined dQ/dV value;
    stopping the first charge at the end of peak voltage value;
  performing a cycle of discharging/charging the cell at the first predetermined rate, the cycle comprising:
    discharging the cell between the end of peak voltage value and a threshold voltage value;
    charging the cell between the threshold voltage value and the end of peak voltage value;
  repeating the cycle until a cycle maximum dQ/dV peak value is smaller than or equal to a second predetermined dQ/dV value during charging of the cell; and
  charging the cell to a fully charged capacity at a second predetermine rate, the second predetermined rate being greater than the first predetermined rate.

By providing such a method, the duration of the formation process may be decreased in comparison to known formation processes.

It has been found that when SEI forms on the anode from the electrolyte, the curve representing the voltage (in volts) as a function of the charge capacity (in mAh) may exhibit a plateau. This plateau is representative of the reactions taking place in the electrolyte with the additive during the formation of the SEI on the anode.

However, the identification of the beginning and the end of the plateau may not be easily identified.

Therefore, the first derivative of the charge capacity relative to the measured voltage may be calculated. The first derivative exhibits at least a peak which has a maximum dQ/dV peak value corresponding to a maximum peak voltage value.

An end of peak voltage value is also determined as being a voltage at which a dQ/dV value is smaller than or equal to a first predetermined dQ/dV value, which correspond to a portion of the maximum dQ/dV peak value.

A threshold voltage value is also determined. This threshold voltage value is a voltage value at which the plateau in the curve representing the voltage versus the charge capacity has not begun.

Discharging/charging between the end of peak voltage value and the threshold voltage value at a first predetermined rate allows for the formation of the SEI on the anode without charging the cell to a fully charged capacity. Thus, the duration of the formation process is reduced. The first predetermined rate is used both for charging and discharging the cell.

Repeating the cycle until the maximum dQ/dV peak value for the specific cycle, i.e., a cycle maximum dQ/dV peak value, is smaller than or equal to a second predetermined dQ/dV value allows the SEI to form on the anode.

For example, the second predetermined dQ/dV value may be smaller than or equal to ⅔ of the first maximum dQ/dV peak value.

Although some additive may not have reacted as the peak is still present during charging of the cell, enough SEI has built up on the anode for the retention capacity of cells charged using this method to be very good, for example over 90%.

By performing a first discharging/charging cycle and by repeating the cycle until the cycle maximum dQ/dV peak value is smaller than or equal to a second predetermined dQ/dV value, a number of times the discharging/charging cycle is repeated is determined.

It is to be noted that the method of performing a formation process described above may be performed without including steps in which the cell is left to rest between each charge and discharge step. This further allows reducing the duration of the formation process.

This forming process may be used during production of the cell to control the SEI formation process. Indeed, the voltage and the charge capacity may easily be measured on the cell during the formation process.

There is therefore no need to carry out a large amount of tests before using the method on a new type or category of cells to determine, prior to production, the end of peak voltage value, the maximum peak voltage value, and the threshold voltage value.

The first predetermined dQ/dV value may be smaller than or equal to 20% of the first maximum dQ/dV peak value, preferably smaller than or equal to 10%.

The cycle may be repeated until the peak is no longer present.

When the SEI formation process is completed, which also means that the additive has fully reacted and is deposited as part of the SEI on the anode, the first derivative no longer exhibits a peak. Therefore, the charging up to the fully charged capacity may be performed at a second predetermined rate, this second predetermined rate being greater than the first predetermined rate. This also allows reducing the duration of the formation process.

The first predetermined rate may be smaller than or equal to 2 C, preferably smaller than or equal to 1 C, more preferably smaller than or equal to 0.5 C.

The first predetermined rate allows for the formation of the SEI on the anode. This first predetermined rate allows for the formation of a SEI with good electrochemical properties while not extending too much the duration of the full formation process.

The second predetermined rate may be equal to or greater than 2 C, preferably equal to or greater than 3 C, more preferable equal to or greater than 4 C.

The second predetermined rate allows reducing the formation process duration, as the second predetermined rate is greater than the first predetermined rate. Indeed, as the second predetermined rate is greater than the first predetermined rate, the charge time to reach the fully charged voltage from the end of peak voltage value is smaller at the second predetermined rate than at the first predetermined rate.

The threshold voltage value may be calculated according to equation (1):

$$V_{thresh} = V_{end} - 2*(V_{end} - V_{peak}) \quad (1)$$

where $V_{thresh}$ is the threshold voltage value;
$V_{end}$ is the end of peak voltage value; and
$V_{peak}$ is the maximum peak voltage value.

This method of determining the threshold voltage value in function of the maximum peak voltage value and the end of peak voltage value is an easy and straightforward method allowing determining a voltage value at which the formation process of the SEI is not yet started.

The additive may present at least a dQ/dV peak below a main flat voltage value of the anode.

For example the peak may be present below 3 V, preferably below 2.5 V, more preferably below 2 V.

The peak may be easily identified on the first derivative curve as it is below a so-called main flat voltage which is dependent on the nature of the anode. For graphite anode, typically, this main flat voltage is exhibited above 3 V.

The additive provided in the electrolyte may be selected from an oxalate salt, an ethylene carbonate or a sulfone.

The additive may present a decomposition potential at a smaller voltage than the electrolyte.

These additives may improve the formation of the SEI on the anode and provide a SEI having better in-use characteristics than SEI formed from the electrolyte only. Thus, the life-time of the lithium ion cell may be improved and higher power may be reached.

The first predetermined rate may be chosen as a function of the additive.

By choosing the first predetermined rate in function of the additive, the cell performance may be enhanced. For example, the retention capacity of the cell may be improved. The first predetermined rate may be chosen by carrying out some simple tests on test cells prior to starting the initial charge of the cell. In particular, the first predetermined rate may be chosen in function of the decreasing trend of the dQ/dV curve.

The method may further comprise:
defining a group of cells, each cell of the group of cells having an anode, a cathode, an electrolyte and a separator of respectively the same type as the anode, the cathode, the electrolyte and the separator of the cell;
then for each cell of the group of cells:
adding the additive to the electrolyte;
performing the first charge at the first predetermined rate up to the end of peak voltage value;
performing the cycle of discharging/charging at the first predetermined rate between the threshold voltage value et the end of peak voltage value a number of times determined previously;
charging to the fully charged capacity at the second predetermine rate.

Thus, having defined a group of cells having an anode, a cathode, an electrolyte and a separator respectively of the same type as the anode, the cathode, the electrolyte and the separator of the cell on which the dQ/dV curve has been calculated during the first charge, it is possible to perform a formation process on each cell of the group of cells using the parameters determined on the first cell, i.e., the end of peak voltage value, the maximum peak voltage value, the threshold voltage value at the same first predetermined rate and second predetermined rate, repeating the cycle of discharging/charging each cell of the group of cells the number of time determined on the first cell.

For a given type of cells, the determination of the first predetermined rate, the second predetermined rate, the end of peak voltage value, the maximum peak voltage value, the threshold voltage value, and the number of times the cycle is performed may therefore be determined on one cell and then the formation process using these parameters may be used on the other cells of the same type, i.e., having similar or same anode, cathode, electrolyte and separator.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, and serve to explain the principles thereof.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
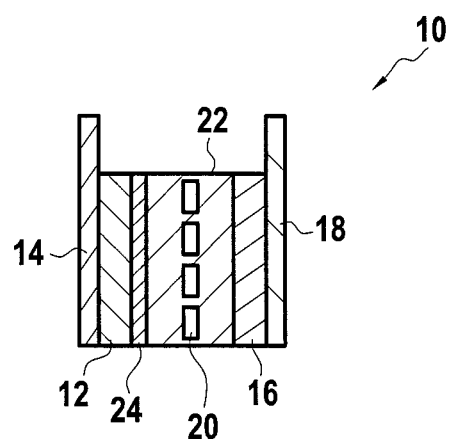
FIG. 1 shows a lithium ion cell.

FIG. 1 shows a schematic representation of an exemplary lithium ion cell 10. The lithium ion cell 10 includes an anode 12 fixed on an anode current collector 14 and a cathode 16 fixed on a cathode current collector 18. The anode 12 and the cathode 16 are separated by a separator 20, the anode 12, the cathode 16 and the separator 20 being immersed in an electrolyte 22.

Typically, the anode 12 is made of a carbonaceous material, the anode current collector 14 is made of copper, the cathode 16 is made of an intercalated lithium compound and the cathode current collector 18 is made of aluminum. Lithium ions present in the electrolyte 22 move from the anode 12 to the cathode 16 during discharge of the cell 10 and from the cathode 16 to the anode 12 when charging the cell 10.

On the anode 12, a solid electrolyte interface (SEI) 24 is formed. The SEI is formed during the formation process of the cell, i.e., during the initial charging of the cell.

Additive may be added to the electrolyte 22 to improve the formation of the SEI.

According to some embodiments, the additive provided in the electrolyte may be selected from an oxalate salt, an ethylene carbonate or a sulfone.

Examples of oxalate salts may include lithium salts of:

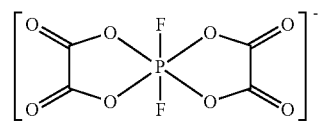

(1)

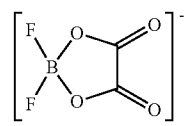

(2)

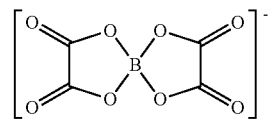

(3)

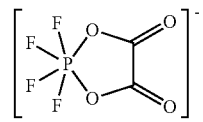

(4)

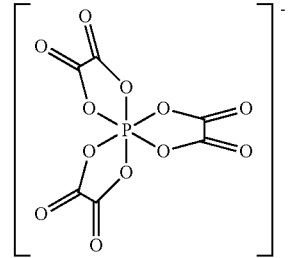

(5)

(1) is difluoro(oxalate)phosphate.
(2) is difluoro(oxalato)borate
(3) is bis(oxalato)borate.
(4) is tetrafluoro(oxalato)phosphate.
(5) is tris(oxalato)phosphate.

Examples of ethylene carbonate may include:

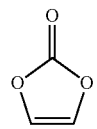

(6)

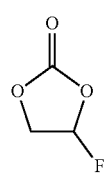

(7)

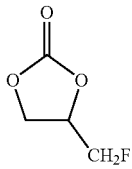

(8)

(6) is vinylene carbonate.
(7) is fluoroethylene carbonate.
(8) is (fluoromethyl)ethylene carbonate.
Examples of sulfone may include:

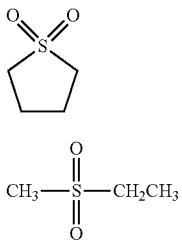

(9)

(10)

(9) is sulfolane.
(10) is ethyl methyl sulfone.

Figure 2A:
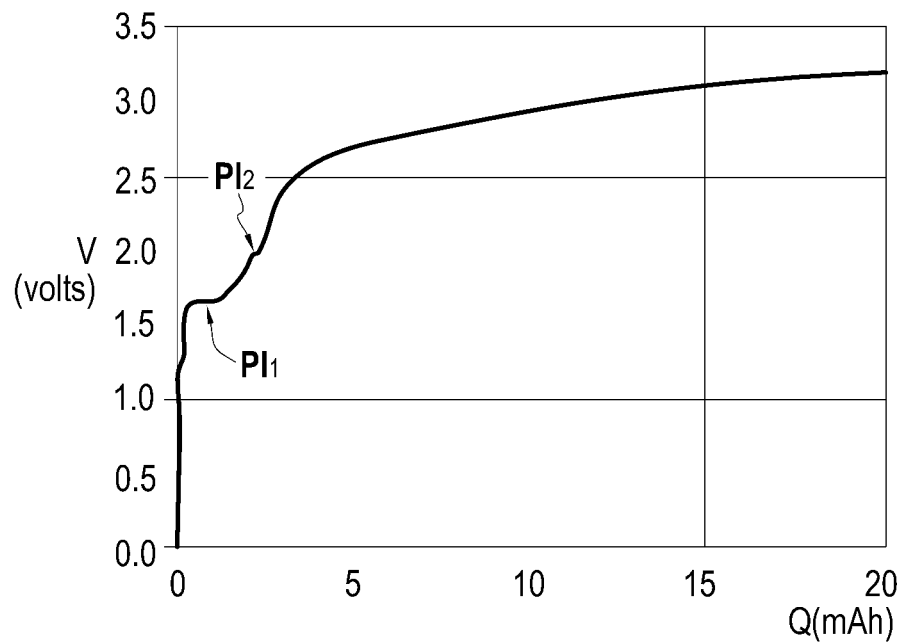
FIGS. 2A and 2B show respectively a graph of the voltage (in volt) as a function of the charge capacity (in mAh) and a graph of dQ/dV as a function of the voltage (in volt)

FIG. 2A shows a graph of the voltage V (in volts) as a function of the charge capacity Q (in mAh—milliampere-hour) while charging the cell 10 in which the anode 12 is made of graphite, the cathode 16 is made of $LiNo_{1/3}Co_{1/3}Mn_{1/3}O_2$ and the separator 20 is made of a film comprising polyethylene. The electrolyte 22 is a mixture of ethylene carbonate, dimethyl carbonate and ethyl methyl carbonate present in equal volume ratio. The electrolyte also comprises $LiPF_6$ at 1 mol/L (mole/litre). The additive is a lithium bis(oxalato)borate salt added to the electrolyte 22 at 5 wt % (weight percent).

As shown at FIG. 2A, the curve exhibits two plateaux $Pl_1$, $Pl_2$ that may be correlated to the reactions of the additive taking place in the electrolyte for the formation of the SEI 24 on the anode 12.

Figure 2B:
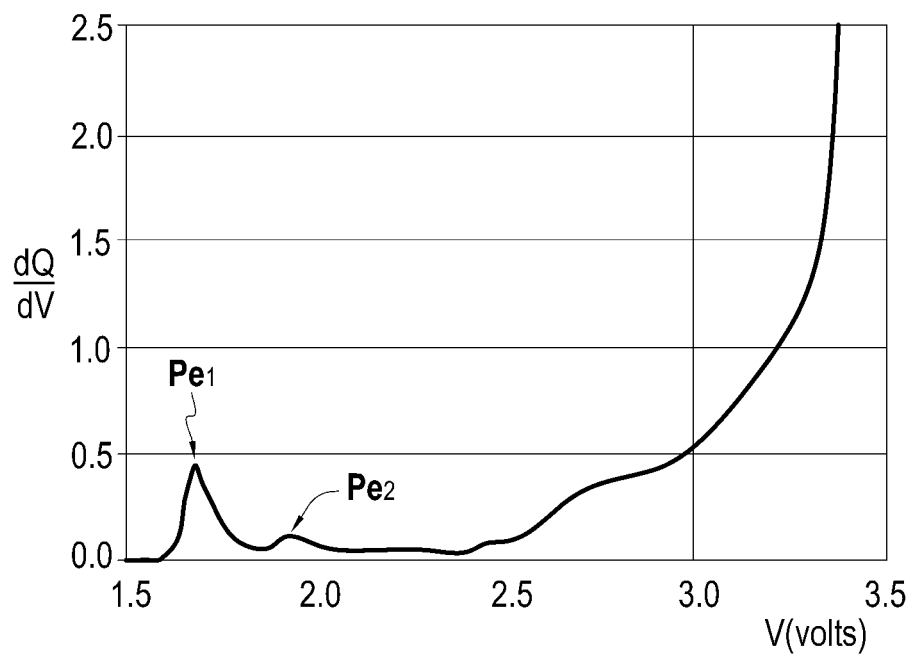

The two plateaux $Pl_1$, $Pl_2$ in FIG. 2A are represented as peaks $Pe_1$, $Pe_2$ respectively in FIG. 2B.

As shown at FIG. 2B, the additive presents at least a dQ/dV peak $Pe_1$ below a main flat voltage value of the anode 12. The main flat voltage value of the anode 12 is approximately equal to 3 V.

Figure 3:
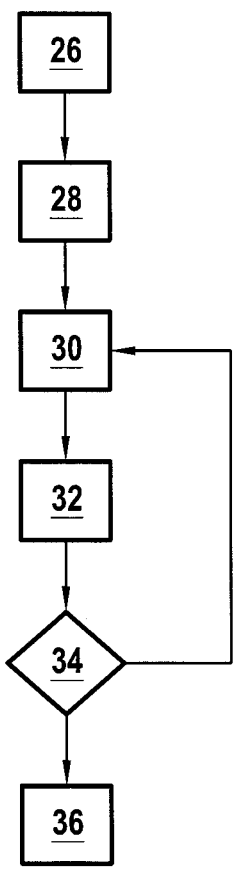
FIG. 3 shows a block diagram illustrating an exemplary method according to embodiments of the present disclosure.

FIG. 3 shows a block diagram of an exemplary method according to some embodiments of the present disclosure.

In step 26, the additive is added to the electrolyte 22 in the cell 10 for improving the SEI 24 build-up on the anode 12.

Then, in step 28, the cell 10 is charged at a first predetermined rate $C_1$. For example, the first predetermined rate $C_1$ may be equal to 0.3 C. This first predetermined rate $C_1$ allows for the formation of a SEI 24 with good electrochemical properties while not extending too much the duration of the full formation process.

During this first charge, dQ/dV is calculated, dQ/dV representing the derivative of the charge capacity Q as a function of the voltage V. When a peak is detected in the dQ/dV curve, a maximum peak voltage value $V_{peak}$ corresponding to a first maximum dQ/dV peak value and an end of peak voltage value $V_{end}$ are determined. The maximum peak voltage value $V_{peak}$ may be determined with a great accuracy.

$V_{end}$ is determined as being a voltage value at which a dQ/dV value is smaller than or equal to a first predetermined dQ/dV value, for example 20% of the first maximum dQ/dV peak value, preferably smaller than or equal to 10% of the first maximum dQ/dV peak value. Once, the end of peak voltage value $V_{end}$ is reached, the first charge is stopped.

The first predetermined rate $C_1$ may be chosen as function of the additive.

Figure 4:
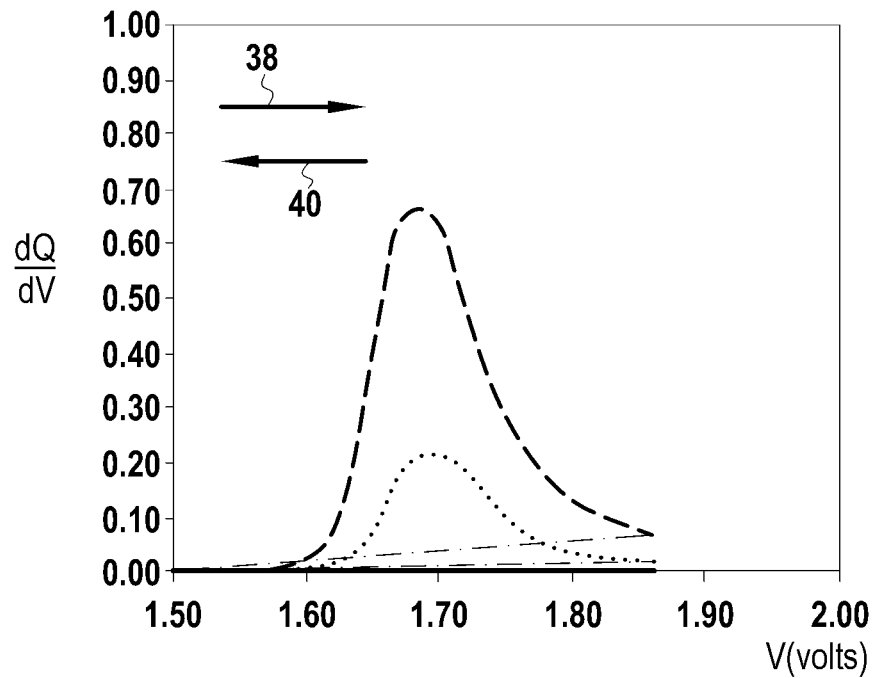
FIG. 4 shows an enlargement of FIG. 2B illustrating the evolution of the peak during the exemplary method according to embodiments of the present disclosure for sample 3.

FIG. 4 shows an enlargement of FIG. 2B during the exemplary method according to embodiments of the present disclosure for sample 3. When charging the cell 10, the voltage increases, as indicated by arrow 38, while when discharging the cell 10, the voltage decreases, as indicated by arrow 30.

The first charge is represented by a dashed line.

The method then proceeds to step 30. During step 30, the cell 10 is discharged at the first predetermined rate $C_1$ between the end of peak voltage value $V_{end}$ and a threshold voltage value $V_{thresh}$. The discharge is represented as a mixed line.

According to some embodiments, $V_{thresh}$ may be calculated according to equation (1).

As shown at FIG. 4, the maximum peak voltage value $V_{peak}$ is equal to 1.68 V (volt) and the end of peak voltage value $V_{end}$ is equal to 1.86 V. Thus, the threshold voltage value $V_{thresh}$ is equal to 1.5 V.

Then the method proceeds to step 32 in which the cell 10 is charged at the first predetermined rate $C_1$ between the threshold voltage value $V_{thresh}$ and the end of peak voltage value $V_{end}$.

The maximum peak voltage value $V_{peak}$, the end of peak voltage value $V_{end}$ and the threshold voltage value $V_{thresh}$ are determined during the first charging and are not recalculated during the application of the method to one peak.

At step 34, a test is performed to determine whether or not a peak was detected during step 32. If a peak is detected during step 32, the method proceeds back to step 30.

As shown at FIG. 4, during step 32, a peak is detected in the curve represented by a dotted line. Thus, step 30 is performed and the cell 10 is discharged at the first predetermined rate $C_1$ between the end of peak voltage value $V_{end}$ and the threshold voltage value $V_{thresh}$.

Then, step 32 is performed and the cell 10 is charged at the first predetermined rate $C_1$ between the threshold voltage value $V_{thresh}$ and the end of peak voltage value $V_{end}$.

At step 34, the test is performed anew. If the peak is no longer present during step 32, the method proceeds to step 36. If a peak is detected during step 32, the method proceeds back to step 30.

As shown at FIG. 4, during step 32, no peak is detected in the curve represented by a solid line (flat solid line coinciding with the X-axis). Thus, step 36 is performed. In step 36, the cell 10 is charged to a fully charged capacity at a second predetermined rate $C_2$. The second predetermined rate $C_2$ is for example equal to 3 C.

FIG. 4 shows an exemplary method in which, step 32 is performed twice. Depending on the nature of the additive, step 32 could be performed only once or could be performed three times or more.

FIG. 4 shows a single peak while FIG. 2B shows two peaks. When the two peaks are related to one single additive, discharging/charging while detecting the major peak, in this case the first peak, will allow reducing the second peak as well. When the first peak is no longer present, the second peak is also no longer present.

When the plurality of peaks is related to different additives, the first charge, i.e., step 28, may be performed for one additive then, steps 30 and 32 may be performed until the peak related to the first additive is no longer present. Then step 28 may be performed again, determining new maximum peak voltage value $V_{peak}$, end of peak voltage value $V_{end}$ and threshold voltage value $V_{thresh}$ for the peak(s) related to the second additive and steps 30 and 32 may then be performed until the peak(s) related to the second additive is/are no longer present.

Various formation processes have been applied to similar cells, i.e., having the same components, to validate performance of a cell 10 in which the SEI 24 is formed on the anode 12 according to the exemplary disclosed method.

However, the number of discharge/charge cycle (steps 30 and 32) is not limited to the embodiment described above. Indeed, step 36 may be performed even when a peak is still detected at step 34, if the maximum dQ/dV peak value during a given cycle, i.e., a cycle maximum dQ/dV peak value is smaller than or equal to a second predetermined dQ/dV value. The predetermined value of the peak value is preferably less than ⅔ of the maximum peak value, more preferably equal to zero. When the predetermine value is equal to zero or close to zero, the peak is no longer present and cannot be detected.

The various formation processes are summarized in Table 1 together with the duration of the formation process and the capacity retention of the cells obtained with the listed formation processes.

TABLE 1

| | formation process | | | | |
|---|---|---|---|---|---|
| | $C_1$ | $C_2$ | Step 32 | Duration (min) | Capacity retention (%) |
| Sample 1 | 0.3 C | 0.3 C | — | 200 | 89 |
| Sample 2 | 0.3 C | 3 C | 1 | 33 | 92 |
| Sample 3 | 0.3 C | 3 C | 2 | 53 | 95 |
| Sample 4 | 0.3 C | 3 C | 3 | 72 | 95 |

Sample 1 has been charged at 0.3 C up to the fully charged capacity.

For Samples 2, 3 and 4, the first predetermined rate $C_1$ is equal to 0.3 C and the second predetermined rate $C_2$ is equal to 3 C.

Figure 5:
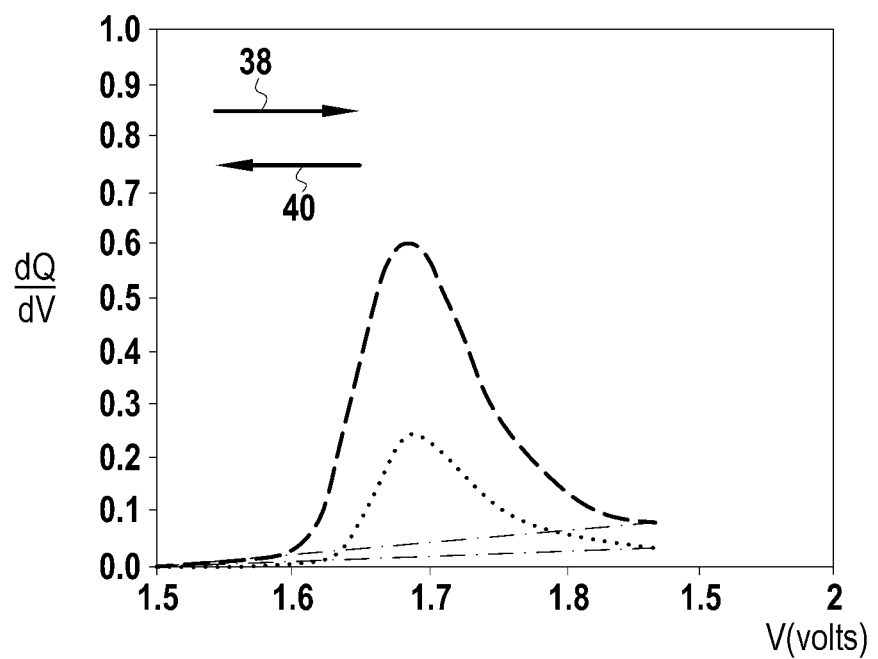
FIG. 5 shows an enlargement of FIG. 2B illustrating the evolution of the peak respectively for comparative sample 2.

As shown at FIG. 5, the cell 10 was charged up to the end of peak voltage value $V_{end}$ (dashed line), discharged down to the threshold voltage value $V_{thresh}$ (mixed line), then charged up to the end of peak voltage value $V_{end}$ (dotted line), at the first predetermined rate $C_1$. Then, although a peak had been detected during the last charging, the cell 10 has been charged up to the fully charged capacity at the second predetermined rate $C_2$. Thus, Sample 2 is obtained performing step 32 only once and thus, a peak may still be detected on charging the cell 10.

Sample 3 was initially charged as described above, step 32 being performed twice.

Sample 4 was charged performing step 32 three times. Although a peak was no longer present while performing step 32 a second time, the cell 10 has been discharge down to the threshold voltage value $V_{thresh}$ and charged again up to the end of peak voltage value $V_{end}$, at the first predetermined rate $C_1$ before charging the cell 10 up to the fully charged capacity at the second predetermined rate $C_2$.

Samples 1 to 4 were then submitted to a cycle test allowing measurement of the capacity retention of each Sample. Samples 1 to 4 were charged and discharged between 3 V and 4 V, 3 V corresponding to the cut off voltage of the cells and 4 V corresponding to the fully charge capacity of the cells at a rate equal to 2 C. Five hundred charge/discharge cycles were performed at room temperature on each Sample and the capacity retention (in %) was calculated dividing the first discharge capacity of the cell by the discharge capacity after the five hundred cycles, expressed in percent.

As shown in Table 1, discharging the cell when a peak is no longer present during the charging step (Sample 4) does not allow increasing the capacity retention of the cell while increasing the duration of the formation process. It can also be seen that although a peak is still detected during the charging step (Sample 2), the capacity retention of the cell is good and the duration of the formation process is reduced significantly.

Therefore, thanks to the exemplary method, one may perform a formation process that has a relatively small duration while forming a good SEI on the anode and having a cell exhibiting good capacity retention.

When applying the method to other cells of the group of cells having an anode, a cathode, an electrolyte and a separator of respectively the same type as the anode, the cathode, the electrolyte and the separator of the cell 10, block diagram of FIG. 3 is still valid.

In step 26, the additive is added to the electrolyte in the cell of the group of cells.

Then, in step 28, the cell of the group of cells is charged at the first predetermined rate $C_1$ up to the end of peak voltage value $V_{end}$. Once, the end of peak voltage value $V_{end}$ is reached, the first charge is stopped.

The method then proceeds to step 30. During step 30, the cell of the group of cells is discharged at the first predetermined rate $C_1$ between the end of peak voltage value $V_{end}$ and the threshold voltage value $V_{thresh}$.

Then the method proceeds to step 32 in which the cell of the group of cells is charged at the first predetermined rate $C_1$ between the threshold voltage value $V_{thresh}$ and the end of peak voltage value $V_{end}$.

At step 34, a test is performed to determine whether or not a number of times the cycle is repeated is equal to the number of times determined during the formation process of cell 10. If the number of times the cycle is repeated is not equal to the number of times determined during the formation process of cell 10, the method proceeds back to step 30.

Then, step 32 is performed and the cell of the group of cells is charged at the first predetermined rate $C_1$ between the threshold voltage value $V_{thresh}$ and the end of peak voltage value $V_{end}$.

At step 34, the test is performed anew. If the number of times the cycle is repeated is equal to the number of times determined during the formation process of cell 10, the method proceeds to step 36. If the number of times the cycle is repeated is not equal to the number of times determined during the formation process of cell 10, the method proceeds back to step 30.

In step 36, the cell of the group of cells is charged to a fully charged capacity at the second predetermined rate $C_2$.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The method is described in terms of a single cell. However, it may be easily adapted for batteries having multiple cells.

The invention claimed is:

1. A method of performing a formation process for a lithium-ion cell having an anode, a cathode, an electrolyte and a separator, the formation process comprising:
adding an additive to the electrolyte for improving a solid electrolyte interface build-up on the anode;
performing a first charge of the cell at a first predetermined rate, the first charge comprising:
calculating dQ/dV during the first charge;
detecting a peak in the dQ/dV curve;
determining an end of peak voltage value and a maximum peak voltage value corresponding to a first maximum dQ/dV peak value, the end of peak voltage value being a voltage at which a dQ/dV value is smaller than or equal to a first predetermined dQ/dV value;
stopping the first charge at the end of peak voltage value;
performing a cycle of discharging/charging the cell at the first predetermined rate, the cycle comprising:
discharging the cell between the end of peak voltage value and a threshold voltage value;
charging the cell between the threshold voltage value and the end of peak voltage value;
repeating the cycle until a cycle maximum dQ/dV peak value is smaller than or equal to a second predetermined dQ/dV value during charging of the cell; and
charging the cell to a fully charged capacity at a second predetermine rate, the second predetermined rate being greater than the first predetermined rate.

2. The method according to claim 1, wherein the first predetermined dQ/dV value is smaller than or equal to 20% of the first maximum dQ/dV peak value.

3. The method according to claim 1, wherein the cycle is repeated until the peak is no longer present.

4. The method according to claim 1, wherein the first predetermined rate is smaller than or equal to 2 C.

5. The method according to claim 1, wherein the second predetermined rate is equal to or greater than 2 C.

6. The method according to claim 1, wherein the threshold voltage value is calculated according to the following equation:

$$V_{thresh} = V_{end} - 2*(V_{end} - V_{peak}).$$

7. The method according to claim 1, wherein the additive presents at least a dQ/dV peak below a main flat voltage value of the anode.

8. The method according to claim 1, wherein the additive provided in the electrolyte is selected from an oxalate salt, an ethylene carbonate or a sulfone.

9. The method according to claim 1, wherein the first predetermined rate is chosen as a function of the additive.

10. The method according to claim 1, comprising:
defining a group of cells, each cell of the group of cells having an anode, a cathode, an electrolyte and a separator respectively of the same type as the anode, the cathode, the electrolyte and the separator of the cell;
then for each cell of the group of cells:
adding the additive to the electrolyte;
performing the first charge at the first predetermined rate up to the end of peak voltage value;
performing the cycle of discharging/charging at the first predetermined rate between the threshold voltage value and the end of peak voltage value a number of times determined in claim 1;
charging to the fully charged capacity at the second predetermine rate.

11. The method according to claim 1, wherein the first predetermined dQ/dV value is smaller than or equal to 10% of the first maximum dQ/dV peak value.

12. The method according to claim 1, wherein the first predetermined rate is smaller than or equal to 1 C.

13. The method according to claim 1, wherein the first predetermined rate is smaller than or equal to 0.5 C.

14. The method according to claim 1, wherein the second predetermined rate is equal to or greater than 3 C.

15. The method according to claim 1, wherein the second predetermined rate is equal to or greater than 4 C.

* * * * *